United States Patent
Amaral et al.

[11] Patent Number: 6,088,360
[45] Date of Patent: Jul. 11, 2000

[54] DYNAMIC RATE CONTROL TECHNIQUE FOR VIDEO MULTIPLEXER

[75] Inventors: John M. Amaral, Ayer; David R. Davis, Leominster; John K. Trimper, Ayer, all of Mass.; Charles F. Barry, Campbell, Calif.

[73] Assignee: BroadBand Networks Corporation, Santa Clara, Calif.

[21] Appl. No.: 08/656,558

[22] Filed: May 31, 1996

[51] Int. Cl.[7] .............................. H04J 3/16; H04N 3/22; H04N 7/12

[52] U.S. Cl. .......................... 370/412; 370/465; 370/468; 348/385; 348/387

[58] Field of Search ..................................... 370/465, 468, 370/442, 443, 444, 486, 487; 395/200, 673, 501, 880, 615; 348/385, 387, 419, 388, 423, 500, 429, 469

[56] References Cited

U.S. PATENT DOCUMENTS

| | | | |
|---|---|---|---|
| 5,341,371 | 8/1994 | Simpson | 370/85.4 |
| 5,381,407 | 1/1995 | Chao | 370/60 |
| 5,461,619 | 10/1995 | Citta et al. | 370/83 |
| 5,600,573 | 2/1997 | Hendricks et al. | 364/514 |
| 5,621,463 | 4/1997 | Lyons et al. | 348/387 |
| 5,754,773 | 5/1998 | Ozden et al. | 395/200.33 |
| 5,784,569 | 7/1998 | Miller et al. | 395/200.65 |
| 5,881,245 | 3/1999 | Thompson | 395/200.49 |

*Primary Examiner*—Huy D. Vu
*Assistant Examiner*—M. Phan
*Attorney, Agent, or Firm*—Skjerven, Morrill, MacPherson, Franklin, & Friel LLP; Brian D. Ogonowsky

[57] ABSTRACT

A video multiplexer is disclosed which incorporates a dynamic rate control feature. MPEG encoded video signals for each channel are stored in a first-in first-out (FIFO) buffer. A packetizer for each channel detects the level in the FIFO buffer and issues a request signal to the video multiplexer that the channel desires to transmit the video signals on the network. The bandwidth allocation for a channel is either preselected by the video provider or automatically selected, and tokens are issued by a counter associated with each channel to give greater network access to those channels which require a higher bandwidth. A token multiplier detects the bandwidth needs of the various channels by detecting the rate that the FIFO buffer is being filled and automatically multiplies the number of consecutive packets which the packetizer may transmit over the multiplexer during a single grant.

28 Claims, 6 Drawing Sheets

DYNAMIC RATE CONTROL TECHNIQUE FOR VIDEO MULTIPLEXER

FIELD OF THE INVENTION

This invention relates to video multiplexers and, in particular, to a technique for allocating bandwidths to video channels connected to the multiplexer.

BACKGROUND OF THE INVENTION

A time division multiple access (TDMA) multiplexer for video signals has as its inputs a plurality of video channels and is controlled to output only one channel at a time at an output port. One use of such a video multiplexer which will become increasingly more popular is in the area of video on-demand. The video provider supplies a different video program on each channel, encodes each video program in accordance with an accepted compression standard (e.g., an MPEG standard), and then multiplexes all the video channels on a single network cable, which may be an electrical conductor or a fiber optic cable. In video on-demand, one of the plurality of video programs multiplexed on the communications network is selected by the customer, and this video selection is then demultipelxed and displayed on the customer's television set.

Other uses of video multiplexers exist. Existing video multiplexers have various drawbacks. One drawback is that these video multiplexers are relatively expensive, for example over five thousand dollars for a particular four-port multiplexer.

In one prior art multiplexer, each video channel provides raw MPEG encoded video signals to the input of the multiplexer. The multiplexer polls each channel in sequence to determine whether the channel is ready to transmit its video data over the network. When a channel is granted access to the network, the multiplexer then synchronizes and packetizes the video signals for that channel in accordance with a certain protocol and applies the packet to a network interface. The network interface modulates the data in the packet and places the packet in the proper form for being transmitted on the network. Such a prior art multiplexer is sometimes referred to as an asynchronous transfer mode (ATM) switch. Such an ATM switch has a fixed number of ports, is difficult to expand for additional ports, is expensive, and a single ATM switch is not compatible with a variety of types of networks due to the bandwidth limitations of either the ATM switch or the network.

An additional drawback of the prior art video multiplexers is that the bandwidth allocated for each channel is either fixed or not dynamically controllable to allow adjustment for high bandwidth channels. Further, the polling of each channel adds overhead to the system which delays its responsiveness to the changing needs of the various channels.

What is needed is a more economical multiplexer that is flexible enough to be used with virtually any network and is responsive to the changing needs of the various channels.

SUMMARY

A video multiplexer is disclosed which incorporates a dynamic rate control feature. MPEG encoded video signals for each channel are stored in a first-in first-out (FIFO) buffer. A packetizer for each channel detects the level in the FIFO buffer and issues a request signal to the video multiplexer that the channel desires to transmit the video signals on the network.

In the preferred embodiment, the bandwidth allocation for a channel is either preselected by the video provider or automatically selected, and tokens are issued by a counter associated with each channel to give greater network access to those channels which require a higher bandwidth. A variable token bucket for each channel stores the issued tokens until needed. A token multiplier detects the bandwidth needs of the various channels by detecting the rates that the FIFO buffers are being filled and automatically multiplies the number of accumulated tokens for the appropriate channels. The number of accumulated tokens are related to the number of consecutive packets which the packetizer may transmit over the multiplexer during a single grant.

By not polling the various channels, but instead sending grants to packetizers with tokens, there is less overhead in the system.

A multiplexer board allows additional channels to be added to the board by plugging in daughter boards. The flexibility of adding channels and the variable rate control for each channel allows the same board to be used with a variety of networks having different bandwidth capacities. A network interface board, customized for a particular network, plugs into the main multiplexer board and modulates the packetized data for transmission on the network.

DETAILED DESCRIPTION OF THE PREFERRED EMBODIMENTS

Figure 1:
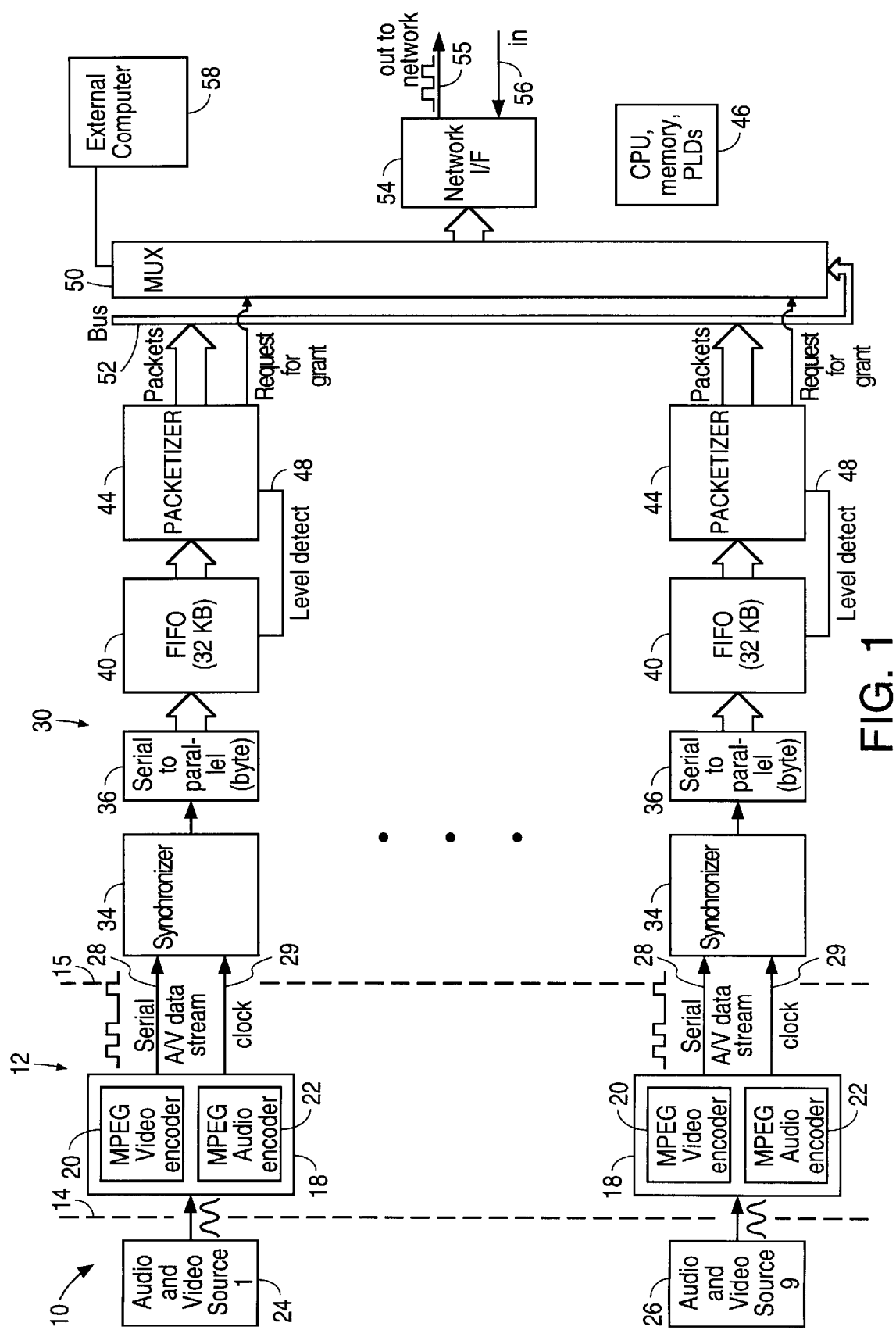
FIG. 1 illustrates the main functional blocks of the multiplexer board and the encoder board of the preferred video processing system.

FIG. 1 illustrates the pertinent portion of the video processor 10 which incorporates the present invention. The video processor 10 also includes circuitry which is not shown pertaining to mixing video sources, providing special effects, providing alarms and redundant circuitry in the event of failures, and other circuitry which is optional and may be conventional.

In a preferred embodiment, the video processor 10 is housed in a cabinet into which is inserted a plurality of boards which are interconnected via conventional board sockets and buses. An encoder board 12, partitioned by dashed lines 14 and 15, contains the MPEG encoder engines 18. These encoder engines 18 are commercially available and, in the preferred embodiment, are C-Cube video RISC processors using a commercially available encoder program. The encoders 18 include an MPEG video encoder 20, for converting the incoming video signals into an MPEG-2 format, or other desired format, and an MPEG audio encoder 22, for converting the incoming audio portion of the signal into a conventional AES/EBU or MPEG-1 layer 2 format. These processors and formats are well known. Other formats may be employed, depending upon the application and the country in which processor 10 is used.

An audio and video source 24 is connected to channel 1, and a different audio and video source 26 is connected to channel 9. Other audio and video sources may be connected to channels 2–8. The video processor 10 may be expanded to process additional audio/video channels. The video input signals may be NTSC, PAL, SVIDEO, or YCrCb analog signals, or digital video signals.

A video input/output circuit, contained within encoders 18, performs any required filtering and digitizing of the incoming video signal into a YUV format for processing by the MPEG encoder 20.

The output of the encoder board 12 is a serial audio/video datastream 28 along with a bit clock 29. As is conventional, the audio data is time-stamped to enable the audio signals to ultimately be synchronized with the video signals.

The present invention is found in the multiplexer board 30.

The A/V datastream 28 and clock 29 are applied to a synchronizer 34. Synchronizer 34 looks for MPEG program or transport stream synchronization patterns (i.e., a predetermined combination of bits) which signal the beginning of a frame of data or other event. In response, synchronizer 34 byte-aligns the incoming data stream. This prevents data being converted incorrectly from serial to parallel. Synchronizer 34 may also issue synchronizing signals, as needed, to the control circuitry controlling the various function elements to signal that a new frame has begun.

The serial A/V datastream 28 is converted into 8-bit bytes by a serial-to-parallel converter 36 using conventional techniques. The bytes are then loaded into a first-in first-out (FIFO) buffer 40 which, in a preferred embodiment, has a 32 KB capacity.

The synchronizer 34, serial-to-parallel converter 36, and FIFO buffer 40 are synchronized by the same clock source derived from clock 29.

The FIFO buffers 40 for the various channels fill up at different rates due to the nature of the MPEG encoding. The MPEG encoding basically reflects only the changes between consecutive video frames. Accordingly, a minimum number of information bits are generated by encoder 18 for a frame which has not changed since the previous frame. Conversely, a large number of information bits must be generated during a frame period by encoder 18 to reflect a large change between consecutive frames, such as would occur in an action sequence in a video program. Accordingly, the bytes applied to the input of FIFO buffer 40 are bursty and unpredictable.

A packetizer 44 addresses the bytes in FIFO buffer 40 and generates packets of data containing not only the audio/video information (the payload) but control and overhead information in accordance with a predetermined protocol. Such control and overhead information include CRC bits, frame identification bits, synchronization bits, source and destination address bits, channel ID bits, sequence bits, time-stamps, and other header information which is called for by the protocol. In one embodiment, the protocol is the AAL5 format for asynchronous transfer mode (ATM) packets. Those skilled in the art of digital communications will understand the various protocols for various networks. Additional details regarding the packetizer will be described later with respect to FIG. 4.

Control and memory circuitry, such as a ROM, RAM, PLD, and CPU, for controlling the overall function of the multiplexer board 30 and the various functional blocks are shown in block 46.

In a first embodiment of the invention, packetizer 44 senses the fill level in FIFO buffer 40 to determine whether there is enough data in FIFO buffer 40 to create a single packet. In one embodiment, packetizer 44 fetches raw MPEG-2 program stream or transport stream data from FIFO buffer 40 when there is enough data for a single 48 byte A/V payload. To detect that such a threshold has been reached, a flag is set when byte number 48 is stored in FIFO buffer 40. This may be accomplished by comparing the byte address to the threshold address. When this flag is triggered, a signal is detected on line 48 by packetizer 44.

Once this threshold is detected, the packetizer 44 then issues a request for grant to multiplexer 50, which is actually an arbiter for determining access to a common bus 52. Multiplexer 50 then grants the request for access to bus 52. In one embodiment, if more than one request for grant is received at the same time, then priority is given in the channel order.

Once a multiplexer 50 grants a request to a packetizer 44, the packetizer 44 retrieves a payload of data from FIFO buffer 40, appends a header obtained from a dual port RAM, calculates the CRC code, and obtains other information needed for the packet in the AAL5 protocol. The packetizer 44 supplies the bytes, as they are being generated, to the common bus 52. The parallel bits on bus 52 are then converted into a serial stream and modulated into the required signals for transmission on the external communications network. Such modulating and other necessary processing is performed by the network interface (I/F) 54 which, in the preferred embodiment, is a plug-in module. Network I/F 54 may convert the electrical signals into optical signals for connection to an optical cable 55 in a SONET system or apply the modulated serial bit stream to a conductive cable on any network (e.g., STS-3). The optical SONET network has a bandwidth of 155 MHz. The network may also provide control signals to processor 10 via cable 56.

The packetizer 44 will typically require several grants from multiplexer 50 before being able to transmit an entire frame of A/V data over bus 52.

Issuing requests for grant rather than waiting for the multiplexer 50 (or arbiter) to poll the packetizers results in a time savings and memory savings in that the packetizers 44 do not have to wait to be polled before being issued access to bus 52. Thus, channels which are not generating data or which are generating data very slowly do not delay bus access to a packetizer which needs access to bus 52. The structure shown in FIG. 1 is also very economical as compared to prior art video processors in that the packetizing is performed by each channel prior to being multiplexed. In certain prior art structures, an ATM switch receives the raw MPEG data, multiplexes the data and packetizes the data. Such a prior art ATM switch is more expensive than the multiplexing circuitry shown in FIG. 1 since multiplexer 50 does not have to be synchronized with the MPEG data in the various channels and thus results in a simpler system. Additionally, the system of FIG. 1 allows for customized or automatic bandwidth allocation to the various channels as described below.

Description of Dynamic Rate Control

While using the system of FIG. 1, it is expected that certain video sources will consistently require more bandwidth than other video sources. This may be the case where one video source (e.g., channel 9) is a sports program while another video source (e.g., channel 1) is a non-action drama. Therefore, although the packetizers 44 for channels 1 and 9 may both request access to bus 52, FIFO buffer 40 for channel 9 is filling up faster than FIFO buffer 40 for channel 1. It is desirable to empty FIFO buffer 40 in channel 9 at a faster rate to prevent FIFO buffer 40 from overflowing. In such a case, using the present system, more bandwidth may be allocated to channel 9 than allocated to channel 1. For example, channel 1 may be allocated a maximum bandwidth of 3 MHz while channel 9 is allocated a maximum bandwidth of 10 MHz.

In the preferred embodiment, packetizer 44 can packetize bytes from FIFO buffer 40 at a rate six times the rate that bytes are being stored in FIFO buffer 40. Thus, FIFO buffers 40 may be emptied relatively quickly once a request for grant is accepted. FIFO buffers 40 can only be accessed by packetizers 44 between the loading of bytes by the serial-to-parallel converters 36.

Figure 2:
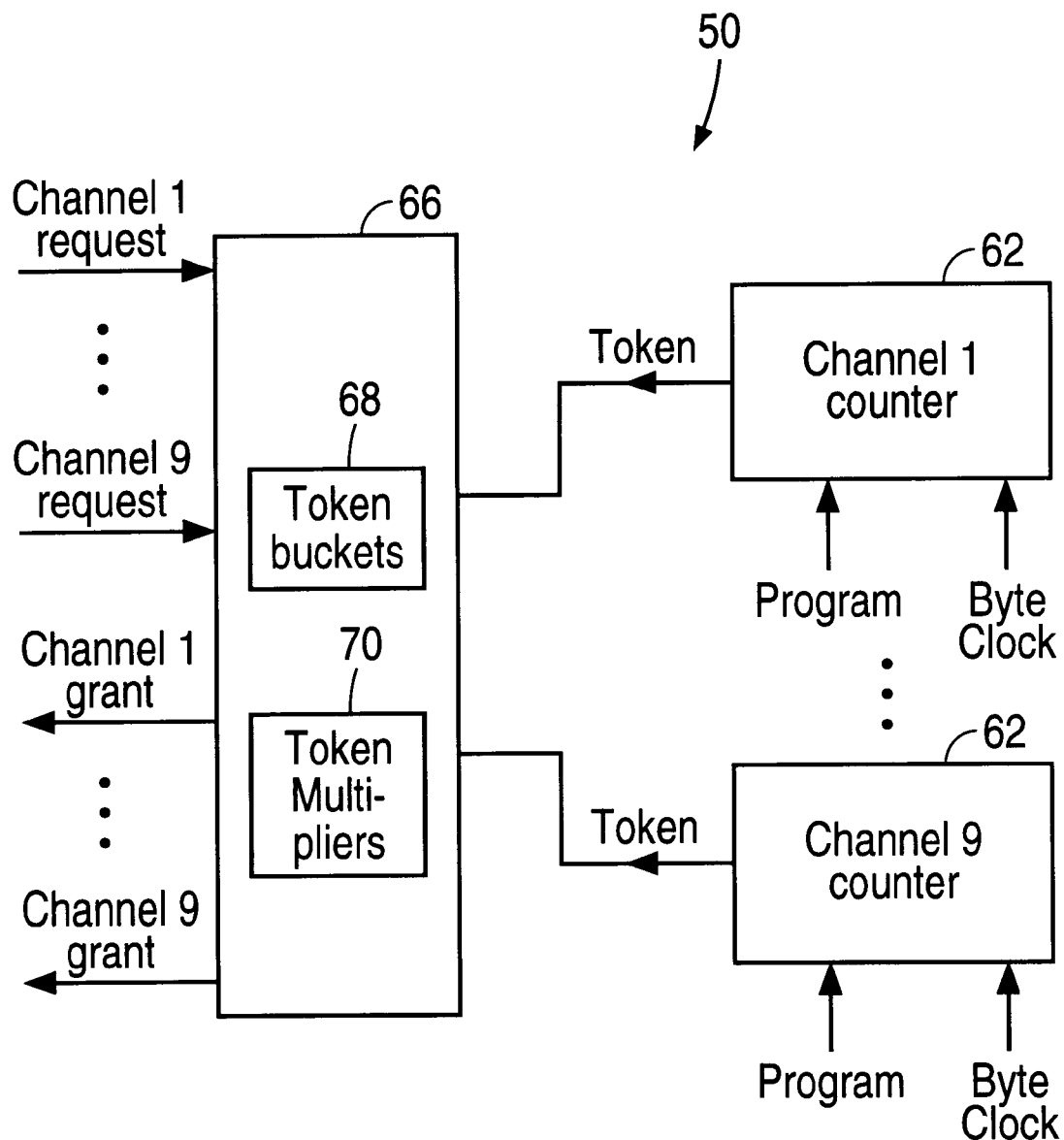
FIG. 2 illustrates additional functional details of the multiplexer pertaining to the dynamic rate control feature.

To allocate different bandwidths to each channel at any time, a controller, using an external personal computer 58, selects the bandwidths for each of the channels. This bandwidth allocation is performed using the functional blocks shown in FIG. 2.

Multiplexer 50 contains a counter 62 for each channel. In a preferred embodiment, counters 62 are 12-bit counters. If all channels were to be given an equal bandwidth allocation, then all counters 62 would be programmed by computer 58 to have the same modulus. A channel which is to be given a higher bandwidth allocation is programmed to have a lower modulus than the counters associated with channels with a lower bandwidth allocation. Once the counters are initially programmed, a register stores this program until changed by the external computer 58.

A byte clock is applied to each of the counters 62. The byte clock is obtained from the same clock which clocks packetizers 44. When a counter 62 counts down from its highest value to 0, the counter 62 issues a token for that channel to an arbiter 66. Arbiter 66 only grants a channel access to bus 52 when there is both a token issued by the counter 62 and a request for grant by the packetizer 44 for that channel. Assuming the expected needed bandwidth for channel 1 is much less than that needed for channel 9, the modulus in the channel 9 counter 62 may be preset to 256 to make the channel 9 counter have 256 states, while the modulus in the channel 1 counter 62 may be preset to 512 to make the channel 1 counter have 512 states. Thus, the counter 62 for channel 9 will issue tokens at twice the frequency as the counter 62 for channel 1. In turn, the packetizer 44 for channel 9 will be able to empty its FIFO buffer 40 at twice the rate that the packetizer 44 for channel 1 can empty its FIFO buffer 40.

A memory (a token bucket 68) used by arbiter 66 stores the tokens for a channel until used by the channel. Once a token is used, it is deleted from the token bucket 68. Thus, a single grant request can use up multiple tokens for transmitting multiple packets. The capacity of the token bucket 68 is programmable up to a maximum of 16, in one embodiment. Tokens issued by counter 62 after the token bucket 68 is full are discarded. Varying the capacity of the token bucket 68 as needed is another way to allocate bandwidth to each channel by selecting a maximum bus 52 access time for a channel.

The above-described bandwidth allocation may be performed dynamically as needed by the various channels. Thus, the use of these tokens and counters 62 sets a maximum bandwidth per channel, and its advantages are utilized when there is not enough total bandwidth in the video processor 10 or not enough buffer memory network to accommodate all the channels.

The setting of the modulus of a counter 62 may also be performed automatically by detecting the level of data in the FIFO buffer 40 and changing the modulus of the token counter 62 as necessary to ensure the FIFO buffer 40 does not overflow.

This dynamic bandwidth allocation is particularly useful in the preferred embodiment of the invention, which uses a motherboard for channels 1, 2, and 3 and is expandable to receive two daughter boards, each containing three additional channels. As more channels are added, the likelihood increases that the bandwidth requirements for one or more channels will exceed the bandwidth granted by multiplexer 50 to those channels unless more bandwidth is allocated to those channels.

In the preferred embodiment of the invention, an additional automatic bandwidth allocation circuit is incorporated into multiplexer 50. In this embodiment, threshold detectors are set at various address locations in FIFO buffers 40 for detecting the data level in FIFO buffers 40. For example, a detector may be set at the one-half full location in buffer 40, the three-quarters full location, and the one-packet full location. The detectors may be simple comparators which detect when a certain location in FIFO buffer 40 is addressed for storing a byte from the serial-to-parallel converter 36. In the preferred embodiment, there are both fixed detectors and movable detectors to provide default and customized bandwidth allocation.

If it is detected that the data in a FIFO buffer 40 exceeds a preset threshold, either over a period of time or after a number of occurrences, this signals that the packetizer 44 for that channel needs access to the common bus 52 at a greater rate. In response, a token multiplier 70 for that channel is automatically programmed to multiply the access time for the packetizer 44 for that channel. For example, if the token multiplier 70 for a high bandwidth channel were set to four, then for each access granted to the packetizer 44 (by the simultaneous occurrence of a request and a token) the access time would be multiplied by four to allow four consecutive packets to be transmitted on bus 52. In one embodiment, the token multiplier can multiply access times two or four times. Since, in the preferred embodiment, a token bucket 68 can hold up to 16 tokens, a maximum bus 52 access time is 16×4, or 64 consecutive packets. In other embodiments, the maximum multiplier may be 16 or greater.

The multiplier value is dynamically adjusted as needed. For example, if it is seen by the threshold detector that the FIFO buffer 40 is ½ full, the token multiplier 70 would be programmed to double its multiplication for that channel until the data level in the FIFO buffer 40 is below the threshold level.

Accordingly, bandwidth allocation for each channel is determined automatically, or by a predetermined allocation, or a combination of both.

Figure 3:
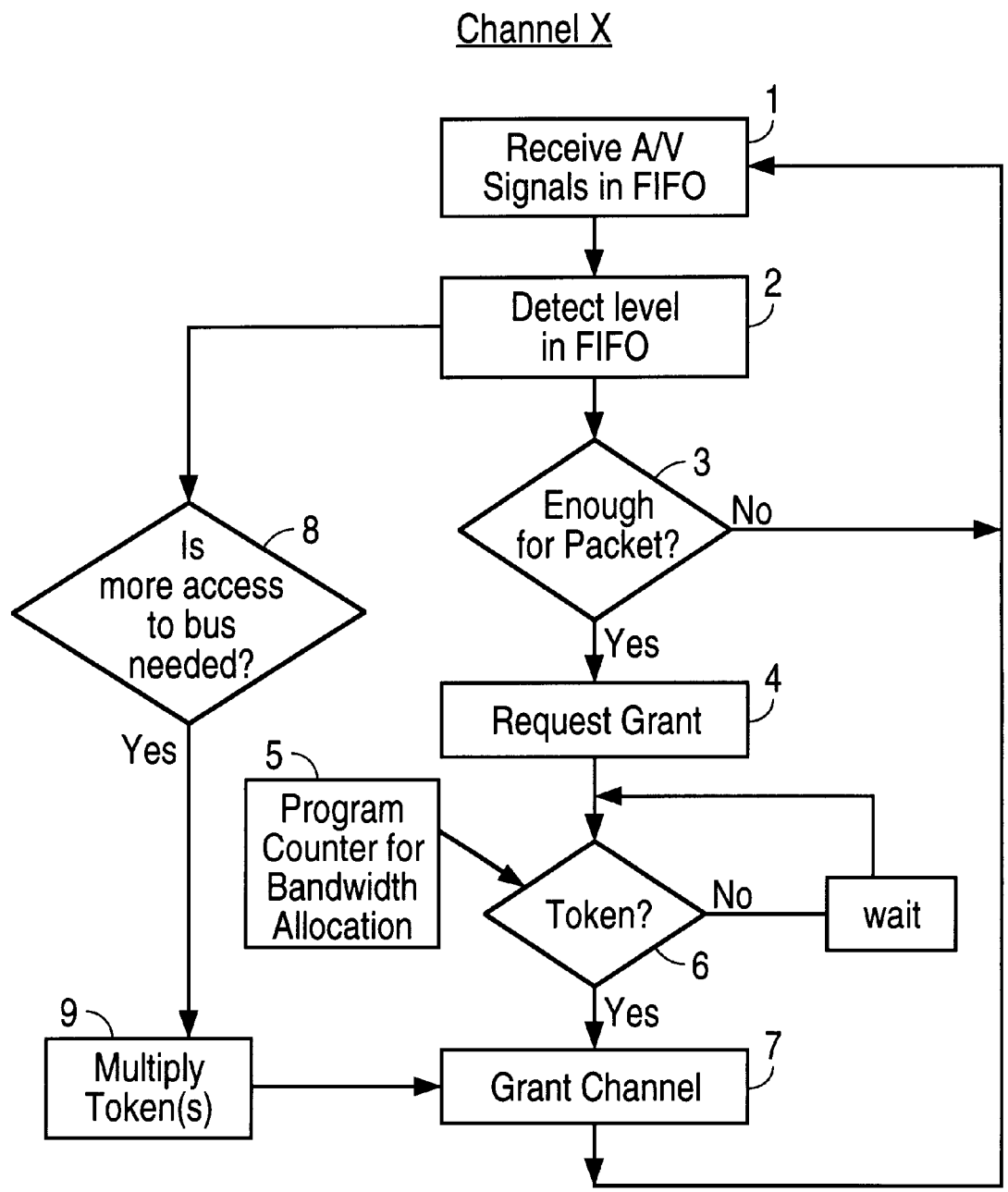
FIG. 3 is a flowchart illustrating the process performed by the multiplexer.

FIG. 3 is a flowchart illustrating this dynamic bandwidth allocation (or dynamic rate control) for any one of the channels. In step 1, the audio/video signals are stored in FIFO buffer 40.

In step 2, packetizer 44 detects the level of data in FIFO buffer 40. This level is also detected by the token multiplier circuit 70 in multiplexer 50 for setting the token multiplier.

In step 3, the packetizer 44 detects whether there is sufficient data in FIFO buffer 40 for generating a single packet. If there is not enough data, then the packetizer 44 waits until this initial level is reached.

In step 4, if there is sufficient data in FIFO buffer 40 to generate a packet, packetizer 44 requests a grant to use bus 52.

In step 5, which may occur at any time, the counter 62 for that particular channel is programmed to issue tokens at a predetermined frequency, depending on the channel's bandwidth allocation.

In step 6, it is now determined whether a token has also been issued for that channel requesting a grant. If no token has issued, the channel must wait until a token has been issued before access to bus 52 is granted.

In step 7, once there is both a request for grant and a token issued for that channel, a channel request is granted by the multiplexer 50. The length of time the channel is granted access to bus 52 depends upon the number of tokens in the token bucket 68 and the token multiplier setting for that channel. This token multiplier is determined in step 8 by detecting whether the level in FIFO buffer 40 is above a preset threshold for a period of time (including an instantaneous period). If it is determined in step 8 that the bandwidth allocation must be increased, the token will be effectively multiplied in step 9 so as to provide a longer access time to bus 52. Conversely, the token multiplier may reduce the access time if it is detected that the FIFO buffer 40 level is low.

Figure 4A:
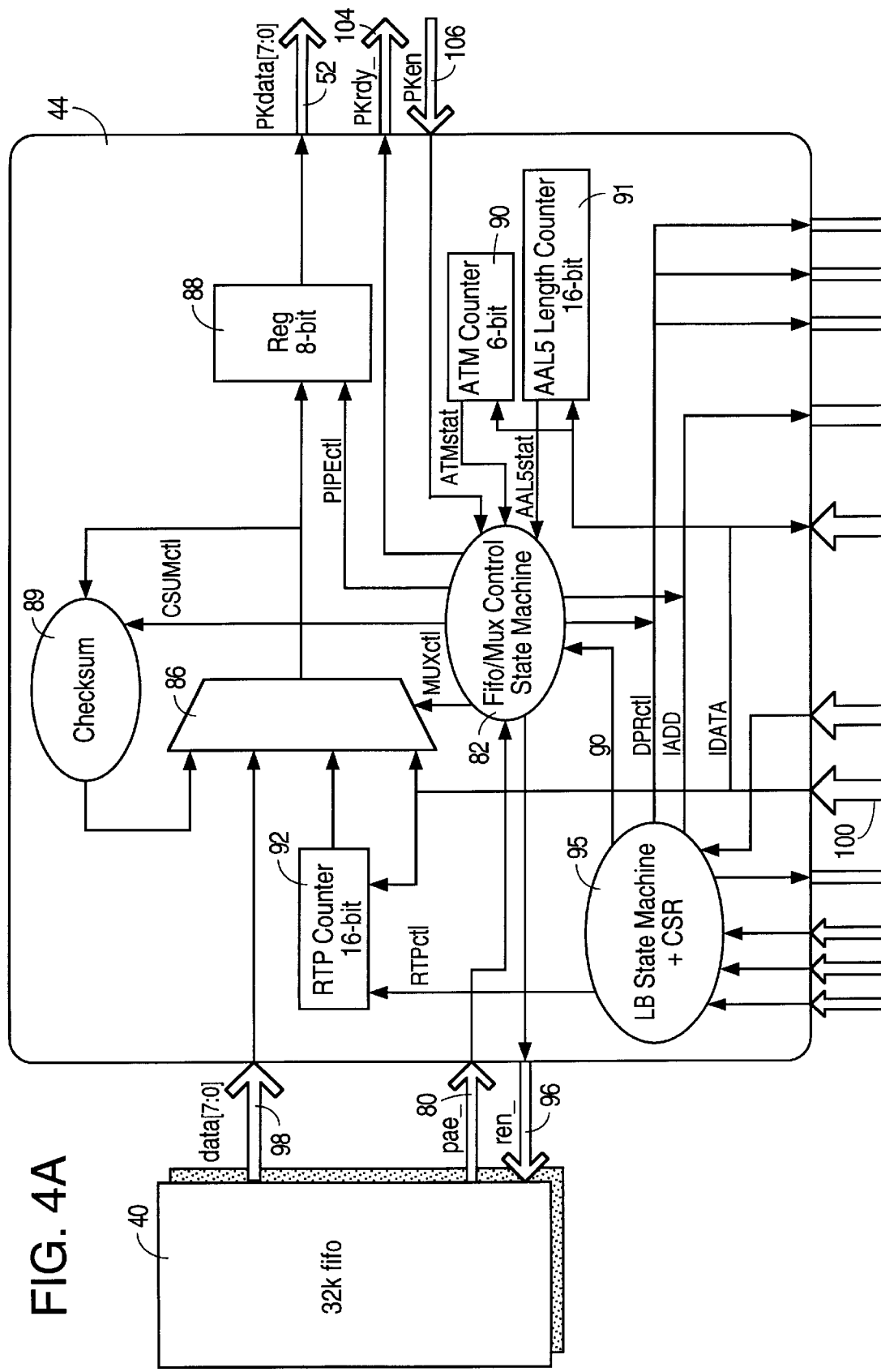
FIG. 4 illustrates additional detail of the packetizer for each channel.
Figure 4B:
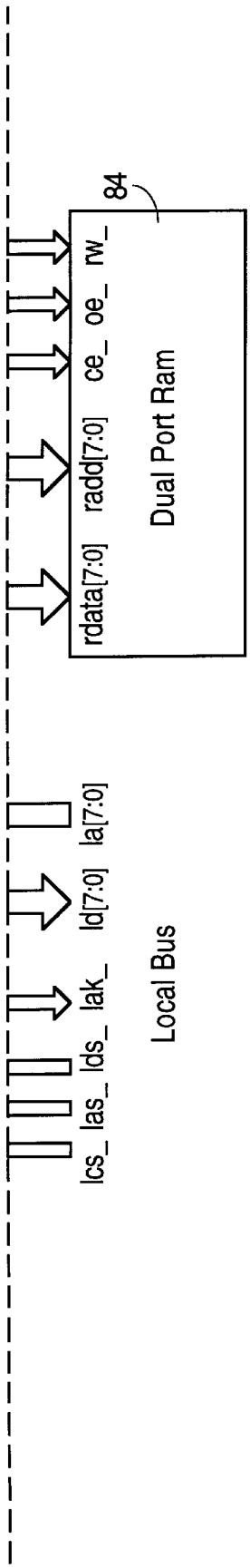
Figure 4:
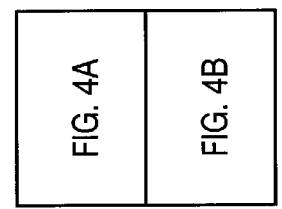

FIG. 4 illustrates in greater detail the packetizer 44 for each channel. Packetizer 44 basically consists of counters which identify the bit positions in the various fields for the protocol and a state machine which calls on sources of data to build a packet. One skilled in the art would understand the function of packetizer 44 in FIG. 4.

Briefly, a signal is generated on line 80 when the data in FIFO buffer 40 has exceeded a predetermined threshold level, such as the data needed for a single packet. A state machine 82, which may be a programmable logic device or other logic circuit, controls the various functions of the packetizer 44 and is clocked by a bit clock (not shown). When packetizer 44 is to generate a packet, the state machine 82 addresses a dual port RAM 84 for the header information. The header information is then applied to an input of multiplexer 86. The state machine 82 controls multiplexer 86 to output this header information to an 8-bit register 88, which then transfers the data onto the bus 52. State machine 82 also controls a checksum circuit 89 for generating checksum bits and supplying these bits to register 88 via multiplexer 86.

Counter 90 counts byte positions in a packet, and counter 91 counts bytes in a single frame or other multi-packet unit. The counters 90 and 91 are programmed for a particular ATM and AAL5 protocol and are used to signal the state machine 82 to access and transmit data. The RTP counter 92 generates a 16-bit sequence number used in the header for designating the sequence of packets in a frame.

The state machine 82 accesses the data in FIFO buffer 40 at the appropriate time by the read enable line 96, and this data is then transferred via parallel lines 98 to multiplexer 86. The state machine 82 controls multiplexer 86 to transfer this data to the register 88 and, in turn, to bus 52.

Additional data for transmission may be provided on a local bus via lines 100, and a local bus state machine 95 (incorporating control status registers) is controlled via a microprocessor (in block 46 in FIG. 1) to load data in RAM 84 and to control other aspects of packetizer 44. For example, the local bus may signal to the packetizer 44 that it should be deactivated after a frame is complete, or reset values in the packetizer 44.

Thus, the packetizer 44 fetches data from the FIFO buffer 40, appends ATM headers and trailers, and transmits the ATM data onto bus 52 until its access time or data has run out. In one embodiment, at the and of a group of packets, such as at the end of a frame, the packetizer 44 will zero-fill the last ATM packet and fetch 4 bytes of AAL5 trailer information from the dual port RAM 84 and output a CRC-32 checksum that is calculated over the entire payload of the AAL5 packet. The program stream AAL5 frame length can be set up to 64K bytes by counter 91.

The request for grant signal is provided on line 104 while the granting of the channel by the multiplexer 50 is provided on line 106.

The ATM and AAL protocols may be found in GR-1113-CORE, Issue July 1, 1994, incorporated herein by reference.

Description of System Modularity

Figure 5:
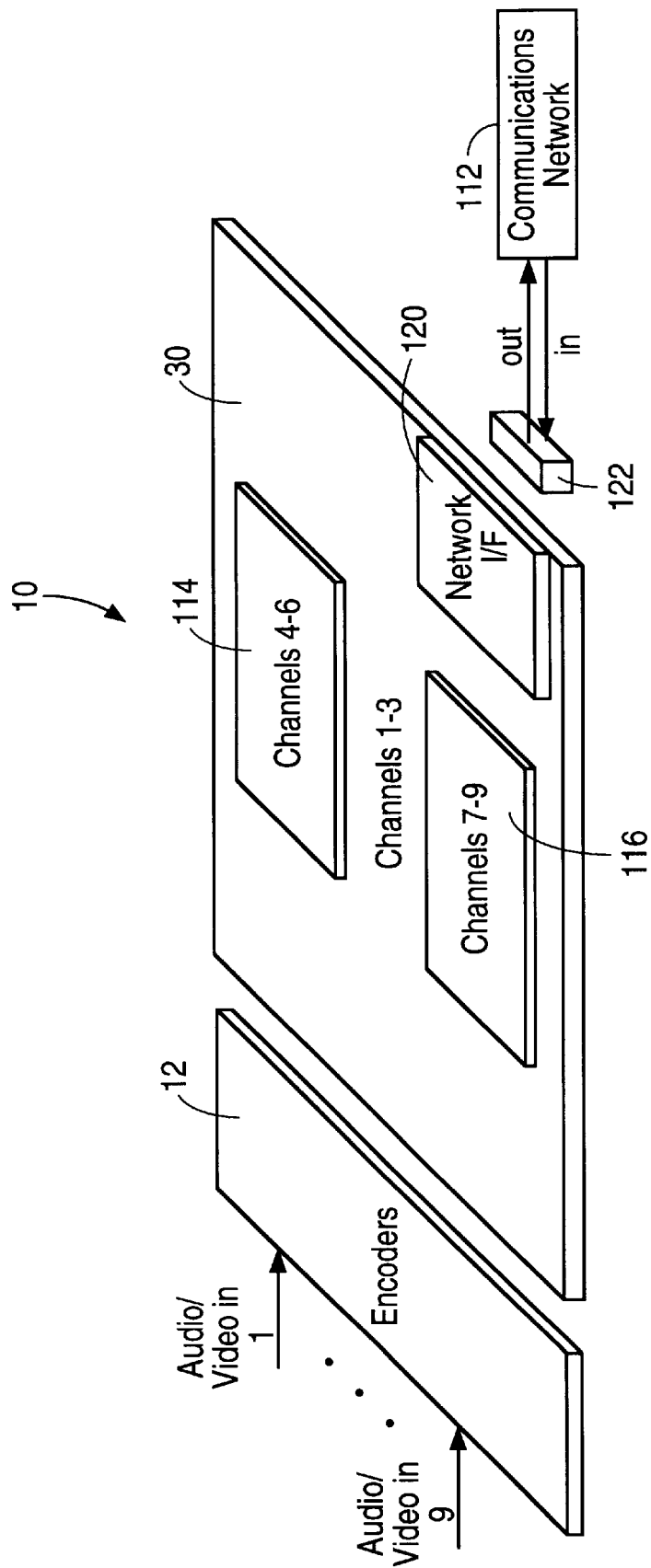
FIG. 5 illustrates the modularity of the video processor and the multiplexer board which allows the same multiplexer board to be used with a variety of communication networks.

FIG. 5 illustrates the encoder board 12 and multiplexer board 30 while supported in a cabinet and interconnected by conventional card sockets and buses.

The dynamic rate control described herein enables the same multiplexer board 30 to be used for virtually any communications network 112, whether it is a high bandwidth optical network (e.g., SONET) or a lower bandwidth network using electrical conductors. The multiplexer board 30 can grow from three channels to six channels by the plugging in of a daughter board 114, containing channel circuitry identical to that shown in FIG. 1, and may be additionally increased to nine channels by plugging in a second daughter board 116.

A network interface (I/F) module 120 is designed for converting the packetized data into signals which may be directly connected to the communications network 112. A connector 122 connects the output signals of the network I/F module 120 to the network 112. Connector module 122 may be an optical interface or other connector.

Due to the various bandwidth capacities of the different communications networks 112 which may be connected to the video processor 10, the maximum bandwidths on the various channels may have to be limited to prevent bandwidth hogging of one or more of the channels, as previously mentioned. In the automatic bandwidth allocation mode, using the token multiplier 70 in FIG. 2, the bandwidth of the network is shared to an optimized extent by the various channels on an as-needed basis. However, if this automatic bandwidth allocation still results in not enough bandwidth to transfer all the video channels' data completely, then the operator of the video processor may intervene by using the external computer 58 (FIG. 1) to limit the upper magnitude of a token multiplier 70 or a token bucket 68 or change the programming of the counters 62 as necessary to optimized the use of the bandwidth of the communication network.

One skilled in the art after reading this disclosure would understand the circuitry and software necessary for implementing this invention.

Although the term packet has been used herein to describe a transmitted unit of data, other terms, such as a cell, are used in the field to be synonymous with a packet.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A video processor having a plurality of channels, each channel for being connected to a source of video data in compressed form, said video processor comprising:

a storage buffer for each of said channels for receiving video data associated with a particular channel;

a packetizer for each channel connected to receive video data from an associated storage buffer;

a bus connected to an output of each packetizer for receiving packets of data output from each packetizer;

an arbiter for receiving grant requests from each of said packetizers to access said bus, each of said packetizers signalling a request for granting access to said bus when it is determined that said storage buffer contains an amount of data greater than a threshold amount;

a dynamic bandwidth allocator for allocating bandwidth on said bus which allows selected channels to have more access to said bus than other channels, said dynamic bandwith allocator issuing tokens to respective channels, said arbiter granting a request from a packetizer to access said bus when there is both at least one token associated with said packetizer and a request for grant by said packetizer; and a token multiplier for each channel which multiplies a number of tokens accumulated for each channel to increase access time to said bus.

2. The processor of claim 1 wherein said threshold amount is an amount of data needed to create a single packet.

3. The processor of claim 1 wherein said storage buffer comprises a first-in first-out (FIFO) buffer.

4. The processor of claim 1 wherein said dynamic bandwith allocator comprises a controller which preselects an allocated bandwidth for each of said channels.

5. The processor of claim 1 wherein said dynamic bandwith allocator allocates bandwidth to each of said channels depending upon the bandwidth requirement for each of said channels.

6. The processor of claim 1 wherein said dynamic bandwidth allocator comprises a token counter for each of said channels, each of said token counters having a modulus, each of said token counters when cycling through a predetermined state causing a token to be issued for its associated channel, said modulus being determined for each token counter based upon an allocated bandwidth for an associated channel.

7. The processor of claim 6 wherein said predetermined state is a zero state for each of said counters.

8. The processor of claim 6 further comprising a token bucket memory for identifying an accumulated number of tokens issued by said token counter for each channel, a token being deleted from said token bucket memory when utilized by said packetizer.

9. The processor of claim 8 wherein said token bucket memory limits a number of accumulated tokens for a respective channel to a selected number of tokens to limit a number of sequential packets which may be transmitted to said bus.

10. The processor of claim 9 wherein a maximum number of tokens stored in each token bucket memory is programmable in order to selectively allocate bandwidth to each channel.

11. The processor of claim 1 wherein each token represents a single packet which may be transmitted to said bus after a packetizer has requested access to said bus.

12. The processor of claim 1 wherein said token multiplier is programmable to select a token multiplication factor.

13. A video processor having a plurality of channels, each channel for being connected to a source of video data in compressed form, said video processor comprising:

a storage buffer for each of said channels for receiving video data associated with a particular channel;

a packetizer for each channel connected to receive video data from an associated storage buffer;

a bus connected to an output of each packetizer for receiving packets of data output from each packetizer;

an arbiter for receiving grant requests from each of said packetizers to access said bus, each of said packetizers signalling a request for granting access to said bus when it is determined that said storage buffer contains an amount of data greater than a threshold amount;

a dynamic bandwidth allocator for allocating bandwidth on said bus which allows selected channels to have more access to said bus than other channels, said dynamic bandwidth allocator issuing tokens to respective channels, said arbiter granting a request from a packetizer to access said bus when there is both at least one token associated with said packetizer and a request for grant by said packetizer; and at least one detector detecting an amount of data within said storage buffer for each channel, an amount of data in said storage buffer exceeding a certain amount causing more tokens to be available for a particular channel to allow said packetizer to increase access to said bus, wherein said at least one detector includes a detector sensing an amount of data needed to fill a complete packet as well as an additional detector detecting an amount of additional data.

14. The processor of claim 13 wherein, when said additional detector detects an amount of data in said storage buffer beyond a certain amount, said additional detector controls a token multiplier to multiply a number of tokens issued for a particular channel to provide additional bandwidth for that particular channel until such additional bandwidth is no longer needed.

15. A video processor having a plurality of channels, each channel for being connected to a source of video data in compressed form, said video processor comprising:

a storage buffer for each of said channels for receiving video data associated with a particular channel;

a packetizer for each channel connected to receive video data from an associated storage buffer;

a bus connected to an output of each packetizer for receiving packets of data output from each packetizer;

an arbiter for receiving grant requests from each of said packetizers to access said bus, each of said packetizers signalling a request for granting access to said bus when it is determined that said storage buffer contains an amount of data greater than a threshold amount;

a dynamic bandwidth allocator for allocating bandwidth on said bus which allows selected channels to have more access to said bus than other channels, said dynamic bandwith allocator issuing tokens to respective channels, said arbiter granting a request from a packetizer to access said bus when there is both at least one token associated with said packetizer and a request for grant by said packetizer; and a multiplexer board which receives additional boards containing circuitry for one or more channels, the number of channels being processed by said processor being determined by the number of additional boards plugged into said multiplexer board.

16. The processor of claim 15 further comprising a network interface module for converting packetized data into signals for connection to a communications network, bandwidths for said channels being allocated to comply with a bandwidth of said network.

17. The processor of claim 1 wherein each said channel communicates audio data as well as said video data and packetizer said audio data along with said video data for transmission.

18. A video processor having a plurality of channels, each channel for being connected to a video source, said video processor comprising:

a storage buffer for each of said channels for receiving video data associated with a particular channel;

a packetizer for each channel connected to receive video data from an associated storage buffer;

a bus connected to an output of each packetizer for receiving packets of data output from each packetizer;

an arbiter for receiving grant requests from each of said packetizers to access said bus, each of said packetizers signalling a request for granting access to said bus when it is determined that said storage buffer contains an amount of data greater than a threshold amount;

a dynamic bandwidth allocator for allocating bandwidth on said bus which allows selected channels to have more access to said bus than other channels, wherein said dynamic bandwidth allocator comprises a token counter for each of said channels, each of said token counters having a modulus, each of said token counters when cycling through a predetermined state causing a token to be issued for its associated channel, said modulus being determined for each token counter based upon an allocated bandwidth for an associated channel; and a token multiplier for each channel which multiplies a number of tokens accumulated for each channel to increase access time to said bus.

19. The processor of claim 18 wherein said token multiplier is programmable to select a token multiplication factor.

20. A video processor having a plurality of channels, each channel for being connected to a video source, said video processor comprising:

a storage buffer for each of said channels for receiving video data associated with a particular channel;

a packetizer for each channel connected to receive video data from an associated storage buffer;

a bus connected to an output of each packetizer for receiving packets of data output from each packetizer;

an arbiter for receiving grant requests from each of said packetizers to access said bus, each of said packetizers signalling a request for granting access to said bus when it is determined that said storage buffer contains an amount of data greater than a threshold amount;

a dynamic bandwidth allocator for allocating bandwidth on said bus which allows selected channels to have more access to said bus than other channels, wherein said dynamic bandwidth allocator comprises a token counter for each of said channels, each of said token counters having a modulus, each of said token counters when cycling through a predetermined state causing a token to be issued for its associated channel, said modulus being determined for each token counter based upon an allocated bandwidth for an associated channel; and least one detector detecting an amount of data within said storage buffer for each channel, an amount of data in said storage buffer exceeding a certain amount causing more tokens to be available for a particular channel to allow said packetizer to increase access to said bus, wherein said at least one detector includes a detector sensing an amount of data needed to fill a complete packet as well as an additional detector detecting an amount of additional data.

21. The processor of claim 20 wherein, when said additional detector detects an amount of data in said storage buffer beyond a certain amount, said additional detector controls a token multiplier to multiply a number of tokens issued for a particular channel to provide additional bandwidth for that particular channel until such additional bandwidth is no longer needed.

22. A video processor having a plurality of channels, each channel for being connected to a video source, said video processor comprising:

a storage buffer for each of said channels for receiving video data associated with a particular channel;

a packetizer for each channel connected to receive video data from an associated storage buffer;

a bus connected to an output of each packetizer for receiving packets of data output from each packetizer;

an arbiter for receiving grant requests from each of said packetizers to access said bus, each of said packetizers signalling a request for granting access to said bus when it is determined that said storage buffer contains an amount of data greater than a threshold amount;

a dynamic bandwidth allocator for allocating bandwidth on said bus which allows selected channels to have more access to said bus than other channels; and a multiplexer board which receives additional boards containing circuitry for one or more channels, the number of channels being processed by said processor being determined by the number of additional boards plugged into said multiplexer board.

23. The processor of claim 22 further comprising a network interface module for converting packetized data into signals for connection to a communications network, bandwidths for said channels being allocated to comply with a bandwidth of said network.

24. The processor of claim 22 further comprising a token multiplier for each channel which decreases the modulus for the respective token counter, to thereby increase the number of tokens periodically issued for the respective packetizer above the preselected number.

25. The processor of claim 22 further comprising a token multiplier for each channel which is adapted to increase the amount of access to said bus granted to the respective packetizer for each token utilized.

26. The processor of claim 22 further comprising at least one detector to sense an amount of data in a storage buffer equal to the threshold amount.

27. The processor of claim 26 further comprising an additional detector, wherein, when said additional detector detects an amount of data in the storage buffer beyond a certain amount, the additional detector is adapted to control a token multiplier to multiply the amount of access to said bus granted to said packetizer.

28. The processor of claim 26 wherein, when the detector detects an amount of data in the storage buffer greater than a certain amount, the detector is adapted to control a token multiplier to multiply the amount of access to said bus granted to said packetizer.

* * * * *